INVENTORS.
EMILIO G. MEYER
BY GIANMARIO BARDONI

Brown, Murray, Flick & Peckham
ATTORNEYS.

Nov. 2, 1971 E. G. MEYER ET AL 3,616,679
PARAMAGNETIC OXYGEN DETECTOR
Filed Nov. 6, 1969 4 Sheets-Sheet 4

INVENTORS.
EMILIO G. MEYER
BY GIANMARIO BARDONI

Brown, Murray, Flick & Peckham
ATTORNEYS.

United States Patent Office
3,616,679
Patented Nov. 2, 1971

3,616,679
PARAMAGNETIC OXYGEN DETECTOR
Emilio G. Meyer and Gianmario Bardoni, Milan, Italy, assignors to Mine Safety Appliances Italiana, S.p.A., Milan, Italy
Filed Nov. 6, 1969, Ser. No. 874,489
Int. Cl. G01n 27/72
U.S. Cl. 73—27 A 9 Claims

ABSTRACT OF THE DISCLOSURE

This invention relates to a paramagnetic gas analyzer of the "magnetic wind" type, operating on the principle that the magnetic susceptibility of a gas, such as oxygen, varies inversely with its temperature. A sample gas is heated in a non-homogeneous magnetic field inside a cylindrical test chamber. The heating elements are recessed in the surfaces of the end walls of the chamber and function only to generate the magnetic wind, which is, in turn, measured by its thermal effect on separate electrical resistance sensors.

---

It is among the objects of this invention to provide a paramagnetic gas analyzer of the above type that will be intrinsically insensitive to thermal conductivity effects involving background gases in the mixture to be tested, that will separate the magnetic wind generating and measuring functions to permit more stable operation, and that will be easily adjustable to align the positions of the measuring sensors relative to the wind generating heaters to provide reliable indications of paramagnetic gas concentration.

These and other objects of the invention will be apparent from the following description of a preferred embodiment in connection with the attached drawings, in which FIG. 1 is an exploded perspective view of one-half of the test cell embodying the present invention;

Figure 1:
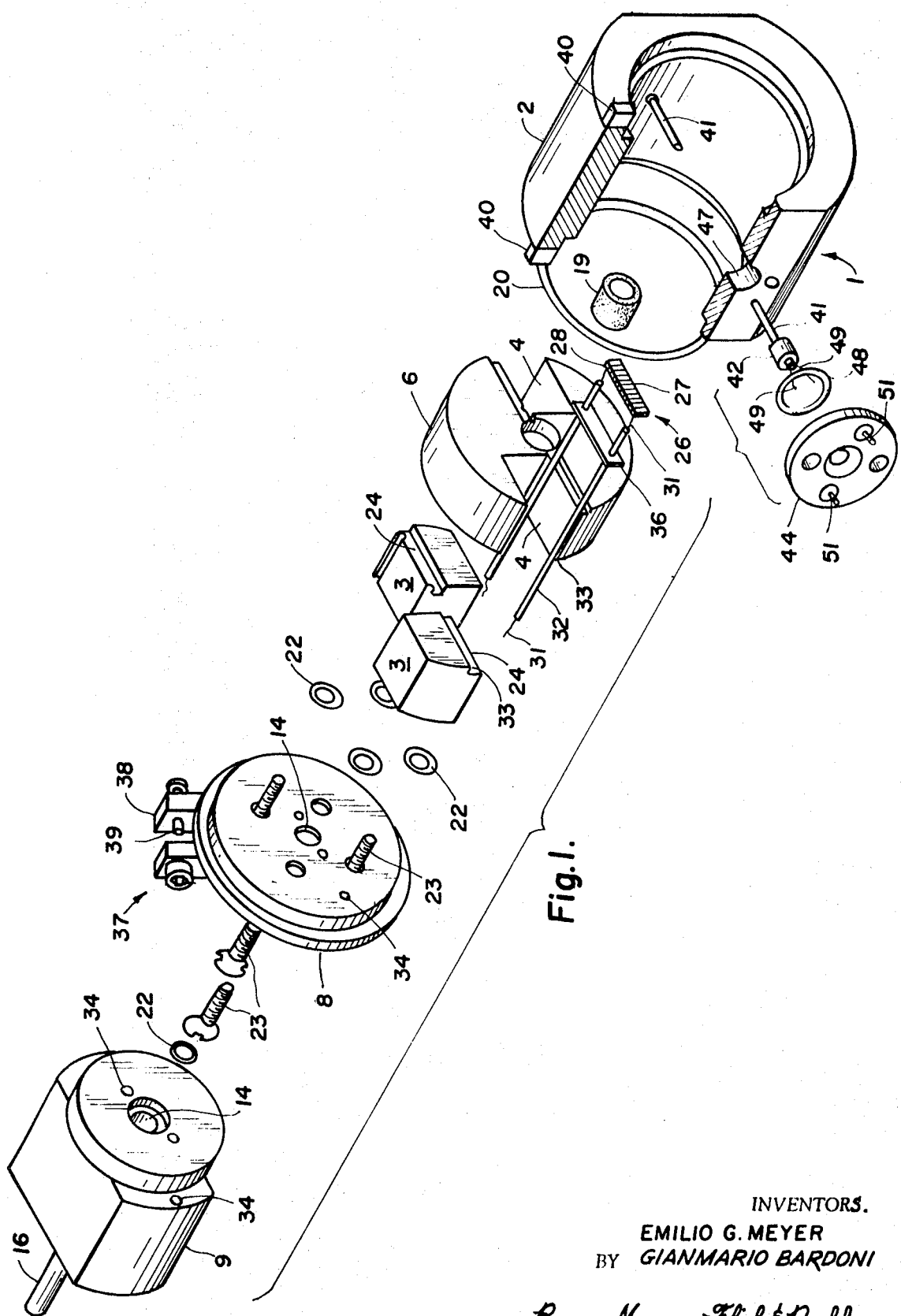

In accordance with the present invention, the analyzer includes a test chamber having a generally circular side wall and flat end walls. A plurality of magnetic pole pieces are arranged in opposed pairs with their opposed faces forming portions of the end walls of the chamber. These pole pieces provide a plurality of circumferentially spaced magnetic fields having lines of maximum magnetic force extending across the chamber and generally parallel to its longitudinal axis. An elongated electrical resistance heating element, extending generally radially of the chamber, is embedded or recessed in the surface of each pole piece opposite a similar element in the other pole piece of the same pair and in the region where the product of the magnetic field intensity and the magnetic field intensity gradient is a maximum. Accordingly, when a paramagnetic gas is present in the chamber, a magnetic wind will be generated in the direction of decreasing magnetic field intensity adjacent the heating elements. This wind flows over separate elongated temperature responsive sensors that extend generally radially of the chamber, there being one sensor adjacent each pair of heating elements; and the resulting change in temperature of the sensors is measured by a suitable electrical circuit. The pole pieces, heating elements, and sensors are preferably so positioned relative to each other that the magnetic wind generated between each pair of pole pieces will be in a direction to provide an augmented or cumulative magnetic wind. In a modification, the pole pieces are differently disposed, so that magnetic winds are generated in opposite directions and are opposed by thermal convection currents to provide pneumatic means for limiting the measurement of the paramagnetic gas to certain ranges of concentration and suppressing other ranges.

Referring to the drawings, the gas analyzer of this invention includes a test cell 1. The central portion of this cell consists of a cell body 2, in which are mounted two pairs of opposed magnetic pole pieces 3 disposed in recesses 4 of two pairs of non-magnetizable metal pole piece receptacles 6. The pole pieces are adapted to be magnetically coupled with a generally U-shaped permanent magnet 7 (shown partially in FIGS. 2 and 4) through pole piece supports 8 and cell caps 9, both of which are of magnetizable material. If desired to resist corrosion, the pole pieces may be of magnetizable stainless steel and the receptacles 6 of non-magnetizable stainless steel.

Figure 2:
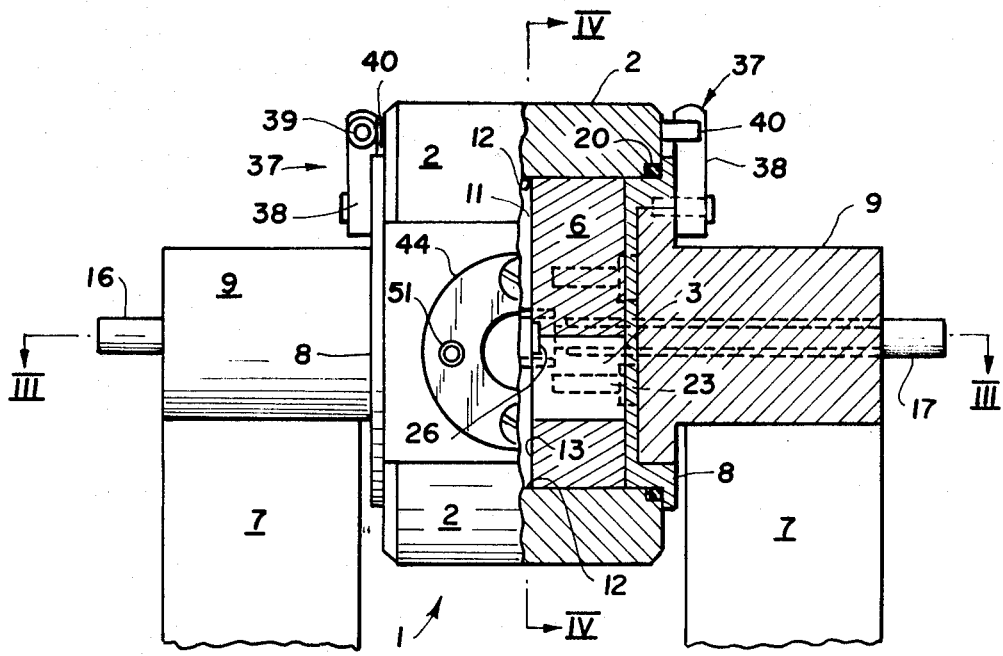
FIG. 2 is a fragmentary side elevation, partly in section, of the complete analyzer.
Figure 3:
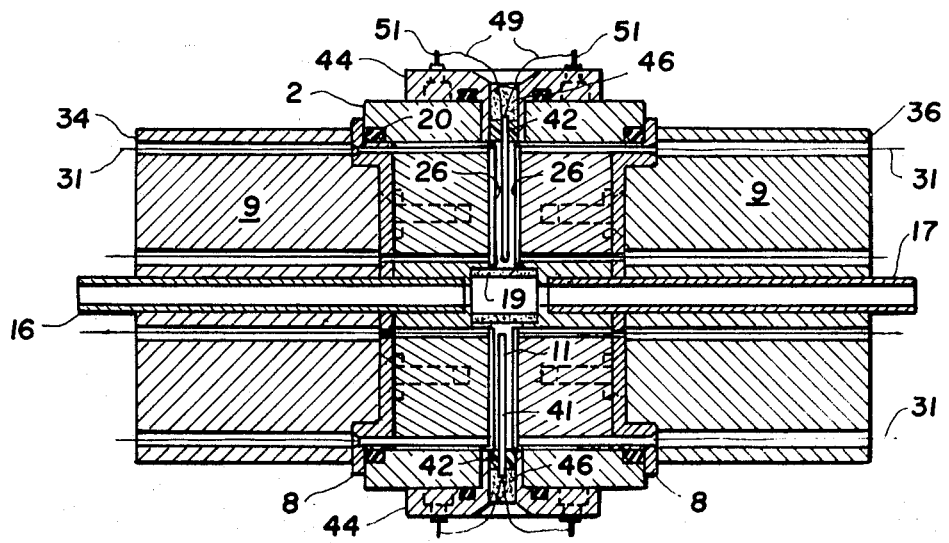
FIG. 3 is a horizontal section along the line III—III of FIG. 2.
Figure 4:
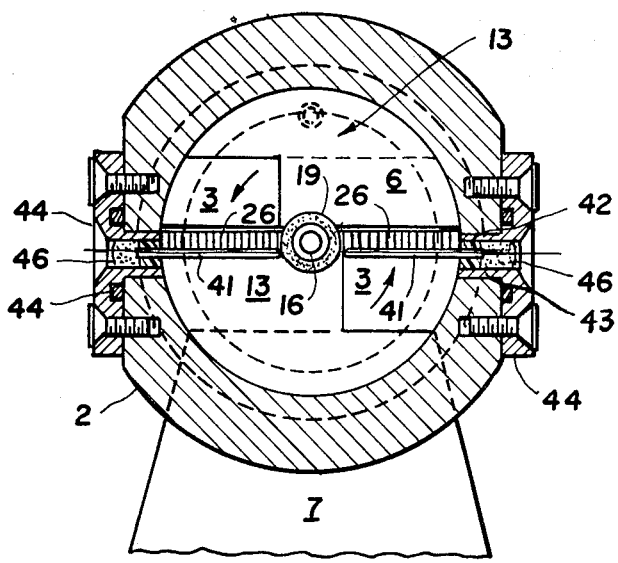
FIG. 4 is a front elevation, partly in section, along the line IV—IV of FIG. 2.

The foregoing parts are assembled, as shown in FIGS. 2–4, to form a cylindrical test chamber 11. This chamber has a circular outer wall 12 (corresponding to a portion of the inner wall of the cell body 2) and flat end walls 13 (corresponding to the inner surfaces of the pole pieces 3 and of the receptacles 6). This chamber is short relative to its diameter. In the arrangement shown in FIGS. 1–4, the two pairs of opposed pole pieces are disposed on opposite sides of a diametral plane (see FIG. 4), with the face of one pole piece in the second quadrant of the circular end wall and the face of the other in the fourth quadrant. Accordingly, the lines of maximum magnetic force will be concentrated in those same two quadrants and extend across the chamber from one end wall to the other and generally parallel to the axis of the chamber.

The pole piece receptacles 6, the pole piece supports 8, and the cell caps 9 are all provided with a central bore 14 for receiving a sample gas inlet tube 16 and a gas outlet tube 17, the latter being connected to conventional exhaust means (not shown) for drawing the same gas through the tubes. The receptacles 6 are counterbored at 18 for receiving a tubular porous diffuser element 19 between the ends of the inlet and outlet tubes, to permit diffusion of the sample mixture into and out of the chamber 11. A gasket 20 seals the joint between each support 8 and the cell body. Other gaskets 22, as shown in FIG. 1, provide seals for the end caps 9 and for threaded fasteners 23 used in assembling the cell.

A portion (adjacent the diametral edge) of the inner faces of each pole piece 3 and receptacle 6 is rabbeted at 24, as shown in FIG. 1, to form shallow central grooves in the end walls of chamber 11, when the parts are assembled, the midline of each groove lying substantially in a single plane that includes the longitudinal axis of the chamber. Recessed or embedded in these grooves, and flush with the adjacent end wall, are electrical resistance heating elements 26, which may be formed, for example, by wrapping fine platinum wire 27 about a flat insulating support 28. Wire leads 31 from the heaters extend through insulating tubing 32 to the outside of the test cell, where they are connected in series (see FIG. 5) across a source of electrical current (not shown). The pole pieces 3 and receptacles 6 are grooved axially of the test cell, as shown at 33 in FIG. 1, to receive these insulated leads; and the supports 8 and end caps 9 are drilled axially at 34 for the same purpose. The heating elements are themselves insulated from the conducting metal of the pole pieces and pole piece receptacles by insulating strips 36 interposed between the heating elements and the bottom of each groove and also by making the heating elements narrow enough to avoid electrical contact with the edges of the grooves in which they are recessed.

The various elements shown in FIG. 1, along with the complementary elements forming the other half of the test cell, are assembled as shown in FIG. 2, and they are held tightly together by the end caps 9, which are secured by suitable means (such as by screws or adhesives, not shown) on the ends of the magnet 7. In this assembly, each pole piece support 8 and its associated pole pieces 3 and heaters can be rotated independently as a unit relative to the cell body 2 by adjusting means 37, for the purposes described later herein. The adjusting means include a pair of ears 38 rigidly secured as by screws to each pole piece support 8 and provided with adjusting screws 39. These screws are adapted to engage opposite sides of lugs 40 rigidly secured to and projecting from opposite edges of the cell body 2, as best shown in FIGS. 1 and 2. The required adjustments are quite small and do not interfere with the leads 31. Of course, if desired, the pole pieces 3, the supports 8, and the end caps 9 may be made as an integral unit.

It will be noted that the heaters 26 are arranged in pairs directly opposite each other, with the midline of each heater in that region of the magnetic field where the product of the magnetic field intensity and the magnetic field intensity gradient is a maximum. (Along the radial edge of each heater that is embedded in the pole piece face, the magnetic field intensity is at a maximum but the intensity gradient is at a minimum; along the opposite radial edge that is embedded in the face of a pole piece receptacle, both the intensity and the gradient are at a minimum.) Extending parallel to each pair of heaters, and in a region where the magnetic wind is at a maximum, is an elongated thermal responsive sensor 41. The outer end of each sensor is embedded in a cylindrical plug 42 of insulating material fitting tightly into a sleeve portion 43 of a side cap 44, where it is secured by an additional plug of adhesive material 46 (see FIGS. 3 and 4). Each side cap is adapted to be held by screws to the outside of the cell body 2, with the cap sleeve portion 43 received in an opening 47 in that body, so that the sensors extend substantially radially (actually parallel but close to a diameter of the test chamber) and directly in line with each other. A gasket 48 received within an annular groove on the inner surface of each cap (FIGS. 3 and 4) provides a seal between the cell body and the side cap. Each sensor may be made from fine platinum wire wound spirally on an insulating support, or may be a series of thermistor beads, or other device having an electrical resistance that is responsive to a change in temperature. The sensor is provided with electrical leads 49, which lead to insulated terminals 51 on the side caps, and are connected in the Wheatstone bridge circuit shown in FIG. 5. With the magnetic pole pieces and heaters arranged as shown in FIG. 4, the magnetic wind that is generated inside the test chamber when a paramagnetic gas is present will be in a counterclockwise direction, as shown by the arrows. One of the sensors (that on the left) will be heated by the magnetic wind, while the other (the one on the right) will be cooled, thereby producing a maximum temperature differential for measuring the magnetic wind.

Figure 5:
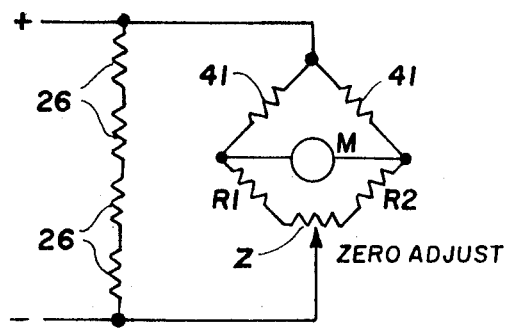
FIG. 5 is a schematic wiring diagram showing the separate electrical circuits for heating the gas to create a magnetic wind and for measuring the temperature changes of the sensors resulting from that wind.

In operating the device, the Wheatstone bridge of FIG. 5 is preferably adjusted by means of potentiometer Z to a zero reading of the meter M with the heaters 26 disconnected from the electrical circuit (or operated at greatly reduced temperature) and in the absence of a paramagnetic gas in the test chamber. The heaters are then operated at their normal temperature, and any deviation from a zero reading on the meter, such as might be caused by misalignment of the sensors relative to the heaters, may be compensated for by rotating the cell body 2 with respect to one or both pole piece supports 8 by manipulating the adjusting means 37, previously referred to. The two sensors are connected in two adjacent arms in the Wheatstone bridge circuit, along with the fixed resistors R1 and R2, so that the signal generated by the cooling of one sensor and the heating of the other will produce an additive signal to the meter M.

Figure 8:
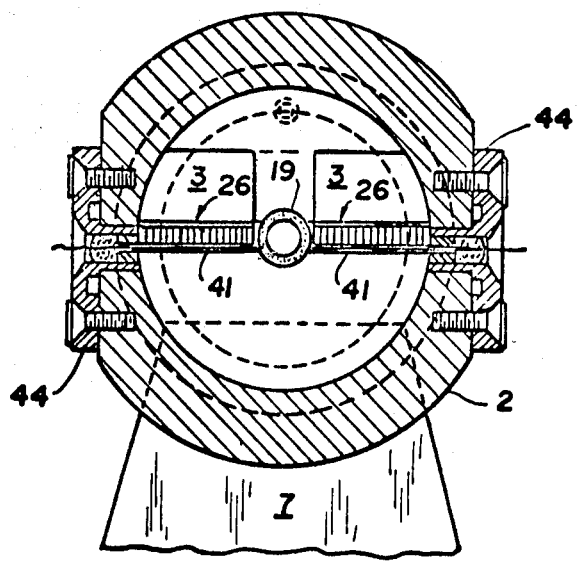
FIG. 8 is a view, similar to FIG. 3, of a test chamber incorporating the modified arrangement of pole pieces and pole receptacles of FIG. 7.
Figure 6:
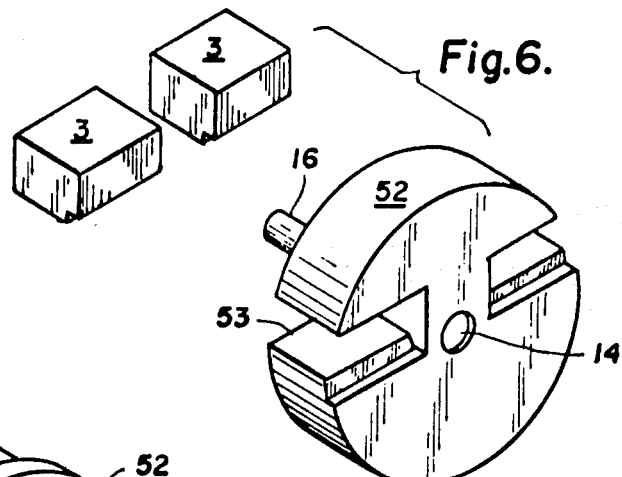
FIG. 6 is an exploded perspective view of a modified arrangement of magnetic pole pieces and pole piece receptacle.
Figure 7:
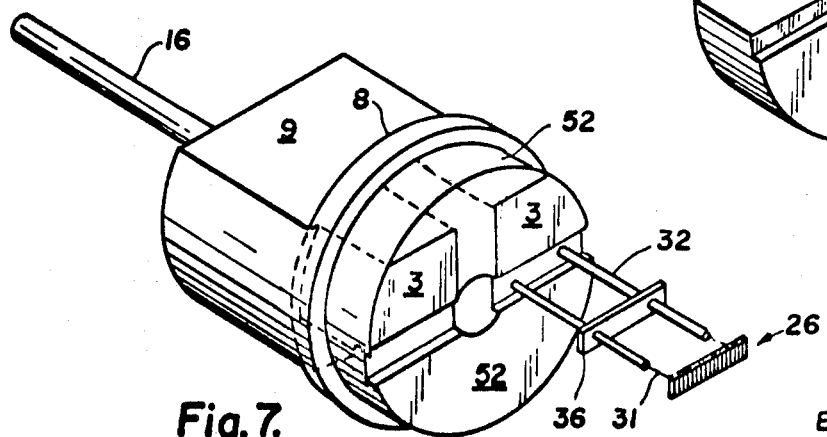
FIG. 7 is a perspective view of the assembled elements shown in FIG. 6.

As previously stated, with the magnetic pole pieces and heaters arranged as shown in FIG. 4, the magnetic wind generated adjacent each heater will move in a counterclockwise direction, so that the their total effect is cumulative. By rearranging the location of one of the two pairs of magnetic pole pieces, without changing the location of the heaters or the sensors, it is possible to obtain a configuration in which the magnetic wind generated adjacent one filament will be in a direction opposite to the magnetic wind generated at the other heater. Such a modification is shown in FIGS. 6–8, in which the magnetic pole pieces, instead of occupying the second and fourth quadrants as shown in FIG. 4 are disposed in the first and second quadrants, i.e., are symmetrically disposed about a central vertical axis. As best shown in FIG. 6, the pole piece receptacles 52 have their recesses 53 also in the first and second quadrants.

Figure 9:
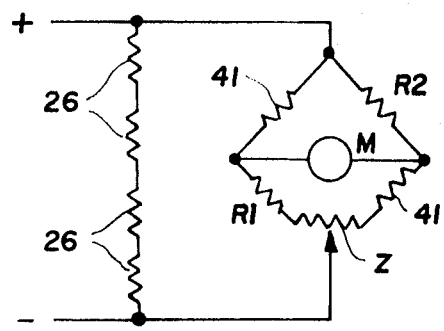
FIG. 9 is a schematic wiring diagram of an electrical circuit for use with the analyzer shown in FIG. 8.

The modified form of the device shown in FIG. 8, when connected in the circuit of FIG. 9 (the sensors 41 are now in opposite arms of the bridge circuit), permits the suppression of certain ranges in measuring the concentration of a paramagnetic gas (as for example, suppressing the range 0–19% oxygen and permitting the full scale measurement of 19–21% oxygen) and does so by pneumatic means rather than by conventional electrical means. With the arrangement shown in FIG. 8, the magnetic wind generated by the heater on the left will be counterclockwise, while that generated by the heater on the right will be clockwise. When the test cell is oriented as shown, that is, with the heaters extending horizontally, the magnetic wind will be directed downward relative to each sensor. Such downward flow will be opposed by the upward flow of gas in the test chamber due to normal convection, reflecting the tendency of a warm gas to rise. These upward convection currents are utilized to nullify the magnetic wind created by a particular concentration of oxygen (for example, 19% oxygen), the maximum nullification or compensation being obtained when the heaters are horizontal. This may be reduced to a desired level (for example, 15% oxygen) by rotating the test chamber as a unit, so that the heaters are inclined rather than horizontal, in which case the magnetic wind tends to be stronger than the opposing convection currents. On the other hand, when the elements of the test cell are arranged as shown in FIGS. 1–4, the orientation of the test cell is not important.

It is among the advantages of the present invention that it is intrinsically insensitive to thermal conductivity effects caused by changes in the composition of the background gas or gases. For example, in a conventional paramagnetic analyzer, after the bridge is initially balanced in the presence of nitrogen lone it will not remain balanced when carbon dioxide is substituted for nitrogen, because each of those gases has a different thermal conductivity (that of carbon dioxide being lower than that of nitrogen), so that the rate of heat loss from the heating elements to the walls of the chamber will be different when one of those background gases is substituted for the other. These effects are more fully described in application, Ser. No. 475,188, filed July 27, 1965, now Patent No. 3,435,662 by Emilio G. Meyer, one of the applicants herein for a Circuit for a Paramagnetic Gas Analyzer. The insensitivity of the present invention to such changes in the thermal conductivity of the background gas or gases results, in part, from the heaters being recessed in the end walls of the test chamber. So positioned, they are in close proximity to and in thermal conductive relation with the large metal masses of the pole pieces and the pole piece receptacles (which are good heat conductors) and therefore lose only an insignificant amount of heat as a result of the thermal conductivity of the adjacent gases in the chamber. In addition, because each heater is directly opposed to another heater in the same magnetic field zone, the thermal conductivity of the gas between them affects only the rate of heat exchange between the two heaters and does not significantly affect their temperature. In other words, no appreciable heat is lost by the heaters except through the metal walls of the cell structure. This means that the temperature gradient in the cell is essentially constant and not appreciably affected by thermal conductivity changes due to varying gas mixtures in the detector chamber.

A further advantage of the present invention over conventional paramagnetic gas analyzers is that the heaters and sensors function independently. The sensors are not used to provide a temperature gradient for inducing the magnetic wind, which is produced solely by the heaters; and, conversely, the heaters are not included in the measuring circuit with the sensors. This results in more stable operation, because the sensors can be operated at low temperatures and do not dissipate significant power; it also permits the use of more suitable material for the heater elements, since they need not serve also as sensors.

A still further advantage, incident to the modified arrangement shown in FIGS. 6–9, is that it permits the suppression of certain ranges of oxygen concentration (in effect, a displacement of the zero reading of the meter) by pneumatic rather than by conventional electrical means, thereby avoiding the errors usually caused by the amplified influence of atmospheric pressure changes.

We claim:

1. A device for measuring the concentration of a paramagnetic gas in a gaseous mixture, comprising a test chamber having a generally circular side wall and flat end walls, means for introducing the gaseous mixture into the chamber, a plurality of magnetic pole pieces disposed on opposite sides of the chamber in opposed pairs with the faces of the pole pieces forming portions of the end walls of the chamber to provide a plurality of generally circumferentially spaced magnetic fields having lines of maximum magnetic force extending across the chamber and generally parallel to its longitudinal axis, a separate pair of opposed elongated electrical resistance heating elements associated with each pair of pole pieces, each heating element being recessed in the face of a separate pole piece and having a substantially flat surface facing the chamber and forming part of an end wall thereof with the longitudinal midline of such surface extending generally radially of the chamber in a region where the product of the magnetic field intensity and the magnetic field intensity gradient is a maximum and with one longitudinal edge of that surface extending substantially parallel to said midline in a region where the product of the magnetic field intensity and the magnetic field intensity gradient is a minimum, each opposed pair of heating elements generating a magnetic wind in a circumferential direction from said midline towards said edge in the presence of a paramagnetic gas in the chamber, a separate elongated electrical temperatue responsive sensor disposed within the chamber and extending generally radially thereof adjacent each pair of heating elements, and electrical circuit means for measuring the temperature change of the sensors alone in response to the magnetic wind generated in the chamber.

2. Apparatus according to claim 1, in which the pole pieces and heating elements are disposed to generate magnetic winds in the same circular direction around the longitudinal axis of the chamber.

3. Apparatus according to claim 1, in which each heating element is also partially recessed in the surface of heat conducting nonmagnetizable portions of the end walls of the chamber adjacent the pole pieces.

4. Apparatus according to claim 1, in which there are two pairs of pole pieces disposed in diagonally opposite quadrants of the circular end walls of the chamber with one edge of each pole piece lying substantially in a plane that includes the longitudinal axis of the chamber.

5. Apparatus according to claim 4, in which the heating elements are also partially recessed in the surfaces of the end walls of the chamber adjacent the pole pieces and such surfaces are of nonmagnetizable heat conducting material.

6. Apparatus according to claim 1, in which there are two pairs of pole pieces disposed in adjacent quadrants of the circular end walls of the chamber with one edge of each pole piece lying substantially in a plane that includes the longitudinal axis of the chamber, and in which the heating elements are disposed to generate magnetic winds in opposite directions around said axis and are opposed and partially nullified by thermal convection currents within the chamber.

7. Apparatus according to claim 6, in which the test chamber is oriented with the heating elements extending substantially horizontally to obtain the maximum thermal convection effect opposing the magnetic winds generated in the chamber.

8. Apparatus according to claim 1, in which the sensors are supported on the circular side wall of the chamber and the pole pieces and heating elements are supported on the end walls of that chamber, and in which means are provided for rotatably adjusting each end wall and its supported pole pieces and heating elements relative to the circular side wall and its supported sensors.

9. Apparatus according to claim 1, in which there are two pairs of pole pieces disposed in diagonally opposite quadrants of the circular end walls of the chamber with one edge of each pole piece lying substantially in a plane that includes the longitudinal axis of the chamber, and in which each heating element is partially recessed in the surface of heat conducting portions of the end wall of the chamber adjacent the pole piece and in which the sensors are disposed in adjacent quadrants in substantial alignment with each other and substantially parallel to the adjacent edge of an associated heating element.

References Cited

UNITED STATES PATENTS

| | | | |
|---|---|---|---|
| 3,045,474 | 7/1962 | Ebbinghaus | 73—27.5 |
| 3,064,465 | 11/1962 | Richardson | 73—27.5 |
| 3,292,421 | 12/1966 | Meyer | 73—27.5 |

RICHARD C. QUEISSER, Primary Examiner

E. J. KOCH, Assistant Examiner